Feb. 6, 1951

R. T. WHITNEY 2,540,771

CONTROL APPARATUS FOR REVERSIBLE ENGINES

Filed June 11, 1949

INVENTOR.
Rolph T. Whitney
BY
Frank E. Miller,
ATTORNEY

Patented Feb. 6, 1951

2,540,771

UNITED STATES PATENT OFFICE 2,540,771

CONTROL APPARATUS FOR REVERSIBLE ENGINES

Ralph T. Whitney, Irwin, Pa., assignor to The Westinghouse Air Brake Company, Wilmerding, Pa., a corporation of Pennsylvania Application June 11, 1949, Serial No. 98,429

7 Claims. (Cl. 74—1)

This invention relates to control apparatus and more particularly to control apparatus for reversible engines.

In certain control apparatus for reversible engines a direction sensing device is employed which comprises a friction shoe adapted to be actuated into friction contact with a rotating crank shaft of a reversible engine to sense the direction of rotation of same through resultant bias in a corresponding direction to condition certain valve mechanism accordingly.

A piston subject opposingly to pressure of fluid in a pressure chamber at its one side and to force of a return spring at its opposite side is employed in such direction sensing device to actuate the friction shoe into contact with the rotating engine crank shaft. The force exerted by the friction shoe on the rotating crank shaft when in engagement therewith depends substantially upon the pressure of fluid supplied to the pressure chamber, and upon the pick-up characteristics of the return spring at the opposite side of said piston.

As the force exerted by the friction shoe on the rotating crank shaft substantially determines the degree of wear of said shoe, and since the pressure of fluid supplied to the friction shoe actuating piston in certain control systems may be greater than in other systems and may even vary in the same system, the force of the shoe on the rotating crank shaft, hence wear of the shoe and shaft, tends to become excessive in the one case and therefore undesirable. Glazing of the face of the friction shoe may also result from such excessive forces, rendering the direction sensing device unreliable.

In view of the preceding, it is a prime object of the present invention to provide a direction sensing device which may be employed in any fluid pressure reversible engine control system, and which regardless of the pressure of the system working fluid, will provide a constant controlled force of the friction shoe on the rotating crank shaft; precluding excessive shoe wear or glazing.

Other objects and advantages will become apparent from the following more detailed description of the invention.

Figure 1:
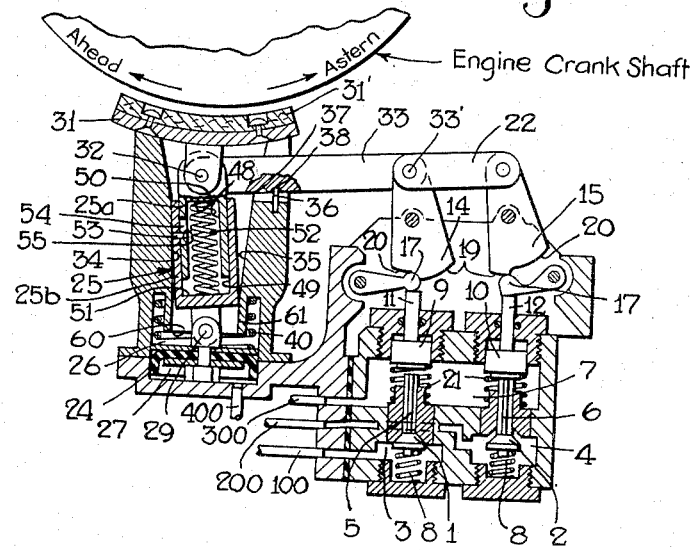
Figure 2:
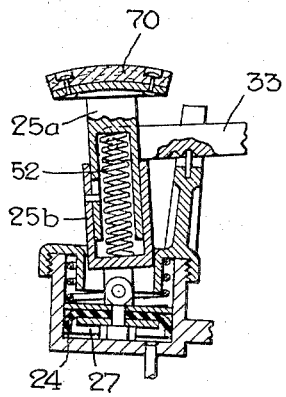

In the accompanying drawing; Fig. 1 is a schematic view substantially in section of a direction sensing device embodying the invention; and, Fig. 2 is a sectional view in portion of a modification of the device shown in Fig. 1.

Description—Fig. 1

Referring to Fig. 1, in the usual form, the direction sensing device may comprise a casing adapted to be mounted on a reversible engine (not shown) in a fixed position adjacent to a rotating part of the engine such as the engine crank shaft, so titled in the drawing, said casing having two poppet valves 1 and 2 contained in chambers 3 and 4 respectively, which are open to the usual ahead and astern control pipes 100 and 200, respectively. The poppet valves 1 and 2 are arranged side by side with parallel extending fluted stems 5 and 6, respectively, which extend into a chamber 7 common to both and connected to such as a pipe 300. The valves 1 and 2 control communication between the chambers 3, 4 respectively, and the chamber 7. A spring 8 in each of the chambers 3 and 4 acts on the respective valve 1, 2 to urge same toward a closed position, in which position the valve 1 is shown in the drawing.

The valve stems 5 and 6 are adapted to be engaged by, respectively, two spaced apart operating plungers 9 and 10 which are slidably mounted in the casing and which are provided with stems 11 and 12 extending outwardly through said casing. Two rockable cams 14 and 15, fulcrumed on pins secured in the casing, are provided for actuating the plunger 11 and 12, respectively. These cams may be identical but reversely arranged, and each is operatively connected to the respective plunger 11, 12 through the medium of a follower element 17 which is rockably mounted on a pin secured in the casing. Each of the cams 14 and 15 is provided with a surface 19, which, when in engagement with the respective element 17, will unseat the respective valve 1 or 2. Adjacent to the surface 19 each cam is provided with a recess 20 which is adapted to receive the respective element 17 to permit movement of the respective plunger 9 or 10 by a spring 21 to a position to permit closure of the respective valve 1 or 2 by the respective spring 8.

The two cams 14 and 15 are operatively connected for movement in unison by a link 22, and since the cams are reversed as above mentioned, movement of the link and cams to the position in which they are shown in the drawing will effect opening of the valve 2 and closing of valve 1, while movement of said link and cams in a clockwise direction, as viewed in the drawing, to a position in which the surface 19 on the cam 14 engages the respective element 17 will effect opening of the valve 1 and closing of the valve 2.

In the usual form, the directional control device further comprises a friction shoe actuating piston 24 which is operatively connected to a friction element 31 through the medium of a piston rod 25.

The piston rod 25 is operably connected at one end by means of a pin 29 to piston 24 and operatively connected at its opposite end by a pin 32 to one end of a link 33, the opposite end of which link is operatively connected by means of a pin 33' to the link 22. The piston rod 25 extends through a non-pressure chamber 26 at one side of the piston 24 at the opposite side of which piston is a pressure chamber 27 adapted to be supplied with fluid under pressure by way of such as a pipe 400.

The friction element 31 may be provided with a shoe 31' generally concave in shape to mate with the cylindrical surface of an engine crank shaft for frictional engagement therewith. The piston rod 25 is capable of sidewise pivotal movement about pin 29 which connects the rod to the piston 24.

In the usual manner, with the crank shaft in rotation, when fluid under pressure is supplied to the pressure chamber 27, the piston 24 will move in the direction of the non-pressure chamber 26, and acting through the medium of the piston rod 25, will cause the friction shoe 31' to engage the rotating engine crank shaft. Such engagement of the shoe with the rotating shaft will bias the piston rod pivotally about the pin 29 in one or an opposite direction toward one or another of two limit positions defined by contact of said rod with one or another shoulder 34 or 35, according as to whether said shaft is turning in one, or an "Ahead" direction or in its opposite, or "Astern" direction. At the time of engagement of the shoe 31' with the shaft 1, the link 33 will be disposed away from a locking pin 36 so that the rod is free for sidewise movement along its longitudinal axis in one direction or its opposite direction with pivotal movement of the piston rod 25 to effect positioning of the cams 14 and 15 accordingly.

If, at the time of engagement of shoe 31' with the crank shaft, said shaft is rotating in its "Ahead" direction, the rod 25 is biased to the position in which it is shown in the drawing in leaning engagement with the shoulder 34, with the link 33 and cams 14, 15 so positioned that the valve 1 is closed and the valve 2 open, and with the pipe 300 consequently disconnected from the ahead control pipe 100 and connected to the astern control pipe 200, for example.

If, conversely, at the time of engagement of shoe 31' with the crank shaft, said shaft is rotating in its opposite "Astern" direction, the rod 25 will rock about the pin 29 to its position in leaning engagement with shoulder 35 opposite that in which it is shown in the drawing, and acting through the link 33 will shift the cams 14, 15 to cause the valve 2 to close and the valve 1 to open, thereby disconnecting the pipe 300 from the astern control pipe 200 and connecting said pipe 300 to the ahead control pipe 100.

The purpose of such connections between the pipe 300 and each of the respective pipes 100, 200 as above described will not be described herein as it is considered to be out of the realm of the invention; suffice it to say that in certain engine control systems it serves a useful function. Reference may be made to United States Patent No. 2,395,202, issued to Roy R. Stevens February 19, 1946 and assigned to the assignee of the present application in which is disclosed a control system employing a similar type of direction sensing device.

Upon release of fluid under pressure from the chamber 27, a piston return spring 40 disposed in the non-pressure chamber 26 will effect movement of the piston 24 in the direction of said chamber 27 to a rest position in which it is shown in the drawing, while the friction element 31 will thereby be moved to a corresponding rest position in which the shoe 31' is disposed away from the engine crank shaft, and the link 33 will return into contact with the locking pin 36 which will project into one or the other of two recesses 37 or 38 formed in said link, thereby locking the piston rod 25, cams 14, 15 and the valves 1 and 2 in the positions which they assumed when shoe 31' last engaged the engine crank shaft.

According to the invention, the piston rod 25 of the present application comprises two portions, 25a and 25b, the former portion extending outwardly in telescopic fashion from the latter portion and carrying the friction element 31, which may be pivotally attached thereto by means of the pin 32; the portion 25b being pivotally connected through the medium of the pin 29 to the piston 24. Both of the portions 25a and 25b are provided with central bores 48 and 49 which extend for a considerable portion of their length to respective transverse shoulders 50 and 51 which accommodate opposite respective ends of a compression spring 52 disposed within the two portions. The spring 52 acts to urge the portion 25a to slide out of the portion 25b, but is prevented from so doing by means such as a removable retaining pin 53 secured in the portion 25a and extending transversely into a longitudinal slot 54 formed in the portion 25b. One end of the slot 54 forms a shoulder 55 against which the pin 53 seats to define a limit position which the portion 25a may assume relative to portion 25b in being forced outwardly by action of the spring 52. The length of the slot 54 is such that upon full travel of the piston 24 in bringing the friction shoe 31' into contact with the engine crank shaft, resultant displacement of portion 25a inwardly of the portion 25b will not cause engagement of the pin 53 with the shoulder formed at the opposite end of said slot. Each time, regardless of the pressure above a certain minimum value, that fluid under pressure, is supplied to the chamber 27, the piston 24 will move to a limit position defined by engagement with such as an annular stop shoulder 60 formed in a projecting member 61 attached to the casing, carrying the shoe 31' into engagement with the engine crank shaft, and telescoping the portion 25a of rod 25 inwardly of portion 25b against opposition of the spring 52. It will be seen that the resultant force created by fluid under pressure acting on piston 24 above that required to hold same seated on shoulder 60 will be absorbed by the rib 61 and that the force exerted by the shoe 31' on the shaft will be the force resultant substantially from the initial compression of the spring 52. It should be pointed out that in installing the direction sensing device, same should be so mounted relative to the engine crank shaft that the clearance between the shoe 31', when in repose position in which it is shown in the drawing and said engine crank shaft will be less than the distance which the piston 24 travels from its repose or released position to its position in engagement with the shoulder 61 to assure proper contact between the shoe and shaft upon operation of the piston.

It will be appreciated from the foregoing that I have provided a direction sensing device comprising a friction shoe actuatable by fluid under pressure into contact with a rotating engine crank shaft to sense direction of rotation of same which may be used without modification in any reversible engine control system regardless of the working pressure of the system and which will provide a constant controlled force of the friction shoe on the rotating crank shaft; precluding excessive wear of said shoe.

According to Fig. 2, a convex shaped shoe 61 may be provided, attached to the piston rod 25 for contact with any size engine crank shaft, should the size vary on different engines, obviating necessity for changing the concave type shoe, such as shoe 31' in Fig. 1, to suit the size of a particular shaft.

Having now described the invention, what I claim as new and desire to secure by Letters Patent, is:

1. In combination, a motion reversible member, structure movable a certain distance from a repose position into engagement with said member, resilient means operatively connected to said structure and movable a distance greater than said certain distance to a position effecting engagement of said structure with said member, fluid pressure means for actuating said resilient means to said position, and means operable by said structure.

2. In combination, a motion reversible member, a longitudinally and transversely movable structure, fluid pressure means movable to a position for actuating said structure longitudinally into engagement with said member, resilient means operatively connecting said structure with said fluid pressure means, and means operable by movement of said structure transversely.

3. In combination, a motion reversible shaft, friction means movable into engagement with said shaft, fluid pressure means movable to a position for effecting engagement of said friction means with said shaft, resilient means pivotally connected to said fluid pressure means and operatively connected to said friction means, and means operable by movement of said friction means when in engagement with said shaft.

4. In combination, a reversible rotatable shaft, friction means movable into engagement with said shaft, means conditioned by movement of said friction means when in engagement with said shaft according to the direction of its rotation, fluid pressure piston means movable to a position for effecting engagement of said friction means with said shaft, and resilient structure connecting said friction means with said piston means, said resilient structure comprising a first tubular member having an open end and an opposite closed end pivotally connected to said piston means, a second tubular member extending slidably into the open end of said first tubular member and having an open end disposed therein and an opposite closed end attached to said friction means, a compression spring disposed within the first and second tubular members cooperable therewith at their opposite closed ends respectively to urge the second tubular member toward outward movement relative to the first tubular member, and stop means secured to said first tubular member and cooperable with said second tubular member to limit the extent of such movement.

5. In combination, a reversible rotatable shaft, friction means movable into engagement with said shaft, means conditioned by movement of said friction means when in engagement with said shaft according to the direction of its rotation, fluid pressure piston means movable from a repose position to a position for effecting engagement of said friction means with said shaft, and resilient structure connecting said friction means with said piston means, said resilient structure comprising a first tubular member having an open end and an opposite closed end pivotally connected to said piston means, a second tubular member extending slidably into the open end of said first tubular member and having an open end disposed therein and an opposite closed end attached to said friction means, a compression spring disposed within the first and second tubular members cooperable therewith at their opposite closed ends respectively to urge the second tubular member toward outward movement relative to the first tubular member, a stop pin secured to said first tubular member, a slot formed in said second tubular member into which said pin projects, said slot having an end wall defining a shoulder for engagement with said pin for limiting the extent of said outward movement when said piston means is in its repose position to define a repose position of said friction means relative to said shaft.

6. In combination, a reversible rotatable shaft, friction means movable into engagement with said shaft, means conditioned by movement of said friction means when in engagement with said shaft, fluid pressure piston means movable from a repose position to a functional position to move and hold said friction means into and in engagement with said shaft, stop means cooperable with said piston means to define said functional position, spring means to return said piston means to its said repose position, a hollow member pivotally connected at its one end to said piston means, a rigid member pivotally attached to said friction means and extending slidably into said hollow member, spring means urging movement of said friction means relative to said hollow member toward said shaft, stop means cooperable between said hollow member and said rigid member to limit the extent of such movement, and stop means cooperable with said hollow member to define opposite limits for pivotal movement thereof.

7. A device for sensing direction of rotation of a reversible shaft comprising in combination, a friction element for engagement with and movement by said shaft, means for limiting movement of said element by said shaft, a fluid pressure actuated piston, a fixed stop for limiting movement of said piston by fluid under pressure, spring means acting on said piston for moving same upon release of fluid under pressure acting thereon, a pair of telescoped members one connected to said piston and the other to said friction element, and a spring interposed between said members under a chosen degree of pressure for moving said element against said shaft with a chosen degree of force in response to operation of said piston by fluid under pressure.

RALPH T. WHITNEY.

REFERENCES CITED

The following references are of record in the file of this patent:

UNITED STATES PATENTS

| Number | Name | Date |
|---|---|---|
| 2,042,915 | Twist | June 2, 1936 |
| 2,464,998 | Stevens | Mar. 22, 1949 |